(12) United States Patent
Nakagawa et al.

(10) Patent No.: US 9,145,804 B2
(45) Date of Patent: Sep. 29, 2015

(54) CONTROL APPARATUS FOR INTERNAL COMBUSTION ENGINE

(75) Inventors: Norihisa Nakagawa, Numazu (JP); Syuntaro Okazaki, Shizuoka (JP); Yuji Yamaguchi, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/358,137

(22) PCT Filed: Nov. 17, 2011

(86) PCT No.: PCT/JP2011/076531
§ 371 (c)(1),
(2), (4) Date: May 14, 2014

(87) PCT Pub. No.: WO2013/073036
PCT Pub. Date: May 23, 2013

(65) Prior Publication Data
US 2014/0305103 A1 Oct. 16, 2014

(51) Int. Cl.
*F01N 3/36* (2006.01)
*F01N 3/10* (2006.01)
(Continued)

(52) U.S. Cl.
CPC ............ *F01N 3/101* (2013.01); *F02D 41/1441* (2013.01); *F02D 41/2461* (2013.01); *F01N 11/007* (2013.01); *F01N 2430/06* (2013.01); *F01N 2560/025* (2013.01); *F01N 2900/0402* (2013.01); *F01N 2900/0408* (2013.01); *F01N 2900/0416* (2013.01);
(Continued)

(58) Field of Classification Search
CPC ... F01N 3/101; F01N 11/007; F01N 2430/06; F01N 2560/025; F01N 2900/0402; F01N 2900/0408; F01N 2900/0416; F01N 2900/1402; F02D 41/1456; F02D 41/2461; Y02T 10/22; Y02T 10/47
USPC ............................................. 60/276, 285, 299
See application file for complete search history.

(56) References Cited

U.S. PATENT DOCUMENTS 5,622,047 A * 4/1997 Yamashita et al. .............. 60/274
6,679,050 B1 * 1/2004 Takahashi et al. .............. 60/285
(Continued)

FOREIGN PATENT DOCUMENTS

JP 06-001747 1/1994
JP 2007-107512 4/2007
(Continued)

*Primary Examiner* — Thomas Denion
*Assistant Examiner* — Jorge Leon, Jr.
(74) *Attorney, Agent, or Firm* — Finnegan, Henderson, Farabow, Garrett & Dunner, LLP (57) ABSTRACT

A control apparatus for an internal combustion engine configured to control the internal combustion engine is provided with: a first F/B controlling device configured to perform first F/B control in which an air-fuel ratio of a gas flowing into a three way catalyst converges to a target air-fuel ratio, on the basis of an output value of an air-fuel ratio sensor; a second F/B controlling device configured to perform second F/B control in which the target air-fuel ratio or the output value of the air-fuel ratio sensor is corrected such that an output voltage value of an oxygen concentration sensor matches a target output value; a learning device configured to learn an output characteristic of the oxygen concentration sensor; and a target value setting device configured to set the target output value according to a learning value of the output characteristic.

6 Claims, 6 Drawing Sheets

(51) Int. Cl.
  *F02D 41/14* (2006.01)
  *F02D 41/24* (2006.01)
  *F01N 11/00* (2006.01)

(52) U.S. Cl.
  CPC .... *F01N 2900/1402* (2013.01); *F02D 41/1456* (2013.01); *Y02T 10/22* (2013.01); *Y02T 10/47* (2013.01)

(56) References Cited

U.S. PATENT DOCUMENTS

| | | | |
|---|---|---|---|
| 2002/0100272 A1* | 8/2002 | Nishimura | 60/285 |
| 2002/0112467 A1* | 8/2002 | Uranishi | 60/277 |
| 2003/0000206 A1* | 1/2003 | Takubo et al. | 60/285 |
| 2003/0041590 A1* | 3/2003 | Kitajima et al. | 60/277 |
| 2003/0140680 A1 | 7/2003 | Nagashima et al. | |
| 2008/0147297 A1 | 6/2008 | Nakagawa et al. | |
| 2008/0295488 A1* | 12/2008 | Takubo | 60/276 |
| 2012/0290192 A1 | 11/2012 | Okazaki et al. | |

FOREIGN PATENT DOCUMENTS

| | | |
|---|---|---|
| JP | 2009-074428 | 4/2009 |
| JP | 2009-74428 | 4/2009 |
| JP | 2009-264341 | 11/2009 |
| JP | 2010-265751 | 11/2010 |
| WO | WO 2011/052096 | 5/2011 |

* cited by examiner

CONTROL APPARATUS FOR INTERNAL COMBUSTION ENGINE

CROSS-REFERENCE TO RELATED APPLICATIONS

This application is a national phase application of International Application No. PCT/JP2011/076531, filed Nov. 17, 2011, the content of which is incorporated herein by reference.

TECHNICAL FIELD

The present invention relates to a control apparatus for an internal combustion engine configured to preferably perform air-fuel feedback (F/B) control of a fuel injection amount.

BACKGROUND ART

There is proposed a system in which an air-fuel ratio sensor and an $O_2$ sensor are disposed on an upstream side and a downstream side of an exhaust gas purifying catalyst, respectively, and which is configured to perform main F/B control and sub F/B control, wherein the main F/B control controls a fuel injection amount on the basis of an output value of the air-fuel ratio sensor such that an air-fuel ratio of an exhaust gas converges to a target air-fuel ratio, and the sub F/B control controls the target air-fuel ratio such that an output value of the $O_2$ sensor converges to a target value (e.g. refer to Patent document 1).

According to an air-fuel ratio control apparatus for an internal combustion engine disclosed in the Patent document 1, the target air-fuel ratio is feedback-controlled to set a constant correction amount per unit time with respect to an oxygen adsorption amount of the exhaust gas purifying catalyst even if an intake air amount changes. It is therefore possible to prevent a significant deviation of an exhaust gas purifying catalyst atmosphere from a purification window even in a large intake air amount state, resulting in an improvement in emission.

Incidentally, Patent document 2 discloses an apparatus configured to change a feedback gain more significantly, if a duration in which output voltage of the $O_2$ sensor is out of an area between a rich side threshold value and a lean side threshold value exceeds a predetermined time length.

PRIOR ART DOCUMENT

Patent Document

Patent document 1: Japanese Patent Application Laid Open No. 2007-107512
Patent document 2: Japanese Patent Application Laid Open No. 2009-074428

DISCLOSURE OF INVENTION

Subject to be Solved by the Invention

As an exhaust gas purifying apparatus for the internal combustion engine, there is a well-known three way catalyst or ternary catalyst configured to purify the exhaust gas by performing the reduction of nitrogen oxide (NOx) and the oxidation combustion of hydrocarbon (HC) and carbon monoxide (CO) at substantially the same time.

It is also revealed that an increase sensitivity of HC and CO decreases and a NOx emission amount is suppressed if the air-fuel ratio within the three way catalyst is maintained at a value slightly lower than a theoretical air-fuel ratio (i.e. a slightly rich air-fuel ratio). For this reason, it has been recently tried to improve exhaust gas purification efficiency under the slightly rich air-fuel ratio.

By the way, an output voltage value of the $O_2$ sensor disposed on the downstream side of the three way catalyst is greater than a reference output voltage value corresponding to the theoretical air-fuel ratio on a rich air-fuel ratio side, and is less than the reference output voltage value on a lean air-fuel ratio side. The rich or lean air-fuel ratio is equivalent to a low or high oxygen concentration with respect to a reference oxygen concentration corresponding to the theoretical air-fuel ratio, respectively.

Moreover, in the $O_2$ sensor disposed on the downstream side of the catalyst, the output voltage value changes substantially linearly with respect to the oxygen concentration only in an area between a detection limiting value on the rich air-fuel ratio side and a detection limiting value on the lean air-fuel ratio side. In other words, in the other area, the output voltage value is substantially constant at a maximum output voltage value corresponding to the detection limiting value on the rich side, or a minimum output voltage value corresponding to the detection limiting value on the lean side. The characteristic as described above is referred to as a Z characteristic or the like.

Here, in order to realize an excellent exhaust gas purification performance under the slightly rich air fuel ratio described above in a system, including the one described in the Patent document 1, in which the air-fuel ratio of a gas flowing into the three way catalyst is influenced by the sub F/B control, a target output voltage value of the $O_2$ sensor needs to be a slightly rich air-fuel ratio equivalent value.

By the way, component parts of the $O_2$ sensor have an inherent individual difference including mechanical variations (e.g. dimensional tolerance) and electrical variations in element characteristics. Moreover, a change with time in the $O_2$ sensor varies depending on its operating environment, and causes an acquired individual difference. All of them are factors to vary an output characteristic of the $O_2$ sensor. For example, due to the individual difference, the maximum output voltage value and the minimum output voltage value of the $O_2$ sensor are not uniform among the sensors. Moreover, a range of the substantially linear change in the output voltage value with respect to the oxygen concentration is not uniform among the sensors. In order to ensure reliability of the sub F/B control based on the output voltage value of the $O_2$ sensor, it is necessary to eliminate the influence of the individual difference as described above.

As a conventional method of eliminating the influence of the individual difference as described above, there is adopted a method in which a numerical value that can be ensured in all the sensors is set as a limiting value in terms of control; however, the limiting value determined in this manner is forced to be a value obtained under the assumption of the worst case.

Thus, in a conventional apparatus including the apparatuses in the Patent documents 1 and 2, the target output voltage value needs to be limited to the reference output voltage value corresponding to the theoretical air-fuel ratio, or a neighborhood value thereof, even though there is a reason why the target output voltage value of the $O_2$ sensor is desirably set on the rich air-fuel ratio side.

Understandably, the limitation on the target output voltage value as described above is an excessively safety conscious measure for most $O_2$ sensors having a practically sufficient oxygen concentration detection performance on the rich air-fuel ratio side. In other words, in the conventional apparatus, the oxygen concentration detection performance of the $O_2$ sensor cannot be sufficiently used, and there is a difficulty in maximizing the exhaust gas purification performance of the three way catalyst.

In view of the aforementioned problems, it is therefore an object of the present invention to provide a control apparatus for an internal combustion engine which is configured to maximize the oxygen concentration detection performance of the $O_2$ sensor disposed on the downstream side of the three way catalyst and which can thus realize an improvement in the exhaust gas purification performance.

Means for Solving the Subject

The above object of the present invention can be solved by a control apparatus for an internal combustion engine configured to control the internal combustion engine which comprises: a three way catalyst disposed in an exhaust passage; an air-fuel ratio sensor disposed on an upstream side of the three way catalyst: and an oxygen concentration sensor disposed on a downstream side of the three way catalyst, said control apparatus comprising: a first F/B controlling device configured to perform first F/B control in which an air-fuel ratio of a gas flowing into the three way catalyst converges to a target air-fuel ratio, on the basis of an output value of the air-fuel ratio sensor; a second F/B controlling device configured to perform second F/B control in which the target air-fuel ratio or the output value of the air-fuel ratio sensor is corrected such that an output voltage value of the oxygen concentration sensor matches a target output value; a learning device configured to learn an output characteristic of the oxygen concentration sensor; and a target value setting device configured to set the target output value according to a learning value of the output characteristic (Claim 1).

The internal combustion engine of the present invention is provided with the air-fuel ratio sensor on the upstream side disposed in the exhaust passage, and the oxygen concentration sensor on the downstream side. The output values of the sensors are typically, but not always limited to, voltage values.

The oxygen concentration sensor is a sensor configured to obtain a relatively high output value (e.g. a high voltage value) on the rich air-fuel ratio side and a relatively low output value (e.g. a low voltage value) on the lean air-fuel ratio side, with respect to a reference output value corresponding to the theoretical air-fuel ratio. Moreover, the oxygen concentration sensor is preferably a sensor having a so-called Z characteristic in which the output value is flat outside a range between a lower limit on the lean air-fuel ratio side and an upper limit on the rich air-fuel ratio side.

The control apparatus for the internal combustion engine of the present invention is configured as various computer apparatuses/systems such as an electronic control unit (ECU), which are preferably configured from a processor such as a central processing unit (CPU). Incidentally, various storing devices such as a read only memory (ROM) and a random access memory (RAM) may be attached to the computer apparatuses/systems.

According to the control apparatus for the internal combustion engine of the present invention, the output characteristic of the oxygen concentration sensor disposed on the downstream side of the three way catalyst is learned by the learning device. In other words, a relative relation between the oxygen concentration and the output value or a value for defining the relative relation in a one-sided or many-sided manner in the oxygen concentration sensor is specified and updated as occasion demands in predetermined timing or in desired timing. The target value setting device sets the target output value of the oxygen concentration sensor (e.g. the target output voltage value) in the second F/B control on the basis of the learning value of the output characteristic.

In other words, according to the present invention, when the second F/B control is performed, it is not necessary to take into account in advance the inherent individual difference which occurs in the oxygen concentration sensor for manufacturing reasons or similar reasons, or the acquired individual difference which occurs in the oxygen concentration sensor due to a time course after vehicle mounting and an operating environment or the like.

Thus, it is no longer necessary to set in advance the target output value of the oxygen concentration sensor in the second F/B control, or an upper limit thereof, as an excessively safety conscious fixed value in anticipation of the individual difference. This allows the oxygen concentration sensor to thoroughly demonstrate its oxygen concentration detection capability.

On the other hand, the target output value of the oxygen concentration sensor in the second F/B control is reflected in the air-fuel ratio of the gas flowing into the three way catalyst. Specifically, the second F/B controlling device corrects the target air-fuel ratio or the output value of the air-fuel ratio sensor in the first F/B control such that the output value of the oxygen concentration sensor matches the target output value.

There are many specific aspects in correcting the target air-fuel ratio or the output value of the air-fuel ratio sensor, as long as the output value of the oxygen concentration sensor matches, converges to, or approaches asymptotically to the target output value. For example, the second F/B control may be configured to correct the target air-fuel ratio or the output value of the air-fuel ratio sensor by using various F/B control terms which are obtained by multiplying a deviation between the output value of the oxygen concentration sensor and the target output value, or a derivative value of the deviation, by various F/B gains.

Here, the reason for the use of the "target air-fuel ratio or the output value of the air-fuel ratio sensor" is that both the correction of the target air-fuel ratio and the correction of the output value of the air-fuel ratio sensor provide the same result because the first F/B control is also performed such that an air-fuel ratio corresponding to the output value of the air-fuel ratio sensor (or a detected air-fuel ratio) matches the target air-fuel ratio.

For example, the second F/B controlling device may correct the target air-fuel ratio of the first F/B control such that the output value of the oxygen concentration sensor matches the target output value. In other words, in this case, if the output value of the oxygen concentration sensor is shifted to the rich air-fuel ratio side, the target air-fuel ratio of the first F/B control is corrected to the lean air-fuel ratio side according to the deviation between the output value and the target output value. If the target air-fuel ratio is corrected to the lean air-fuel ratio side, the fuel injection amount determined such that the air-fuel ratio detected by the air-fuel ratio sensor converges to the target air-fuel ratio is corrected to a reduction side. As a result, the air-fuel ratio inclines toward the lean air-fuel ratio side, and the deviation between the output value of the oxygen concentration sensor and the target output value also decreases. Moreover, if the output value of the oxygen concentration sensor is shifted to the lean air-fuel ratio side, the target air-fuel ratio of the first F/B control is corrected to the lean air-fuel ratio side according to the deviation between the output value and the target output value. If the target air fuel ratio is corrected to the rich air fuel ratio side, the fuel injection amount determined such that the air-fuel ratio detected by the air-fuel ratio sensor converges to the target air-fuel ratio is corrected to an increase side. As a result, the air-fuel ratio inclines toward the rich air-fuel ratio side, and the deviation between the output value of the oxygen concentration sensor and the target output value also decreases.

Alternatively, the second F/B controlling device may correct the air-fuel ratio obtained from the output value of the air-fuel ratio sensor such that the output value of the oxygen concentration sensor matches the target output value and may set a virtual control air-fuel ratio to be referred to in terms of control. In other words, in this case, if the output value of the oxygen concentration sensor is shifted to the rich air-fuel ratio side, the control air-fuel ratio is corrected to the rich air fuel ratio side according to the deviation between the output value and the target output value. If the control air-fuel ratio is corrected to the rich air-fuel ratio side, the fuel injection amount determined such that the corrected control air-fuel ratio converges to the target air-fuel ratio is corrected to the reduction side. As a result, the air-fuel ratio inclines toward the lean air-fuel ratio side, and the deviation between the output value of the oxygen concentration sensor and the target output value also decreases. Moreover, if the output value of the oxygen concentration sensor is shifted to the lean air-fuel ratio side, the control air fuel ratio is corrected to the lean air-fuel ratio side according to the deviation between the output value and the target output value. If the control air-fuel ratio is corrected to the lean air-fuel ratio side, the fuel injection amount determined such that the corrected control air-fuel ratio converges to the target air-fuel ratio is corrected to the increase side. As a result, the air-fuel ratio inclines toward the rich air-fuel ratio side, and the deviation between the output value of the oxygen concentration sensor and the target output value also decreases.

Here, whatever practical aspects the second F/B control and the first F/B control have, a control range of the fuel injection amount in the first F/B control increases if a range which can be adopted as the target output value of the oxygen concentration sensor increases. In other words, a control range of the air-fuel ratio of the gas flowing into the three way catalyst increases. As a result, the air-fuel ratio of the gas flowing into the three way catalyst can be maintained at the slightly rich air-fuel ratio.

Therefore, according to the present invention, the three way catalyst can be used in a more preferable operating area, and the exhaust gas purification efficiency can be improved, in comparison with a case where the target output value of the oxygen concentration sensor can be set only in the vicinity of the reference output value corresponding to the theoretical air-fuel ratio for consideration to safety.

There are many practical aspects when the target value setting device sets the target output value, as long as the learning value can contribute in at least one portion of a setting process. For example, the target value setting device may be configured to set an upper limit which can be adopted by the target output value on the basis of the learning value, and to set the final target output value in consideration with the upper limit and the target output value as a basis which can be set independently of the state of the oxygen concentration sensor. Alternatively, the target value setting device may set the target output value through various calculation processes such as multiplying the learning value by a predetermined coefficient, or substituting the learning value in a predetermined arithmetic expression.

Incidentally, the output characteristic of the oxygen concentration sensor learned by the learning device may be, for example, the maximum output value and the minimum output value of the oxygen concentration sensor. Alternatively, the output characteristic of the oxygen concentration leaned may be a boundary value at which a rate of change in the output value with respect to the oxygen concentration is less than a predetermined rate, or the like.

The learning of the output characteristic by the learning device may be performed in conjunction with timing in which the air-fuel ratio is temporarily made rich in a normal control process of the internal combustion engine, as a preferred form. For example, if fuel-cut (F/C) is performed upon vehicle deceleration, the fuel injection amount is temporarily increased upon return from the F/C in many cases. The learning of the output value may be performed in a period in which the increase in the fuel injection amount is reflected or is supposedly reflected in the exhaust gas existing before and after the three way catalyst. By virtue of this, it is no longer necessary to take a measure such as increasing the fuel injection amount only to learn the output characteristic, and fuel consumption can be reduced. In view of an opportunity of a deceleration operation during travelling, the learning can be performed at a practically sufficient frequency.

In one aspect of the control apparatus for the internal combustion engine of the present invention, said control apparatus for the internal combustion engine further comprises an upper limit setting device configured to set an upper limit of the target output value according to the learning value, and said target value setting device is configured to set the target output value in a range which is less than or equal to the set upper limit (Claim 2).

According to this aspect, it is only necessary to take a measure such as limiting the target output value to the upper limit only if the target output value of the oxygen concentration sensor exceeds the set upper limit or in similar cases, and the target output value can be set basically independently of the state of the oxygen concentration sensor. Therefore, the target output value can be determined, more appropriately.

In another aspect of the control apparatus for the internal combustion engine of the present invention, the output characteristic includes at least one of a maximum output value and a minimum output value of the oxygen concentration sensor (Claim 3).

According to this aspect, the maximum output value corresponding to the detection limit on the rich air-fuel ratio side of the oxygen concentration, or the minimum output value corresponding to the detection limit on the learn air-fuel ratio side of the oxygen concentration, or both the maximum and minimum output values are learned or included as the output characteristic of the oxygen concentration sensor. The maximum output value, the minimum output value, or both the maximum and minimum output values define the aforementioned relative relation in the one-sided manner, and can be specified, relatively easily. Therefore, according to this aspect, a load required for the learning is reduced.

In another aspect of the control apparatus for the internal combustion engine of the present invention, further comprising a learning value correcting device configured to correct the learning value on the basis of a terminal temperature of the oxygen concentration sensor when the output characteristic is learned (Claim 4).

The learning value of the output characteristic of the oxygen concentration sensor changes depending on the terminal temperature of the sensor upon learning. It is therefore possible to further increase reliability of the learning by such a configuration that the learning value is corrected, as occasion demands, on the basis of the terminal temperature.

Since the oxygen concentration sensor is disposed in the exhaust passage, the terminal temperature has a high correlation with exhaust gas temperature. In view of this point, the terminal temperature can be also estimated on the basis of a state value of the internal combustion engine which can define the exhaust gas temperature such as, for example, the number of engine revolutions and a load. By such a configuration, it is no longer necessary to provide the detecting device, such as a specialized sensor for the detection of the terminal temperature, which is advantageous in cost.

In another aspect of the control apparatus for the internal combustion engine of the present invention, further comprising a gain correcting device configured to correct a F/B gain associated with the second F/B control according to the learning value (Claim 5).

If the oxygen concentration sensor deteriorates due to a change with time, the sensitivity of the oxygen concentration sensor to the oxygen concentration decreases. The decrease in sensitivity occurs significantly on the rich air-fuel ratio side. In other words, the minimum output value of the oxygen concentration sensor rarely changes, and the maximum output value significantly decreases. Thus, the change in the output value with respect to the change in the oxygen concentration becomes small on the rich air-fuel ratio side. With the decreasing maximum output value, the reference output value at which an excess air ratio $\lambda$ is 1 (i.e. a theoretical air-fuel ratio equivalent value) also decreases. A range of the change in the output value on the rich air-fuel ratio side decreases with increasing extent of the deterioration.

Thus, as an overall trend of the second F/B control performed according to the deviation between the output value and the target output value, an effect of correcting the fuel injection amount in the first F/B control from the lean air-fuel ratio side to the rich air-fuel ratio side is stronger than an effect of correcting the fuel injection amount from the rich air-fuel ratio side to the lean air-fuel ratio side. As a result, the air-fuel ratio of the gas flowing into the three way catalyst tends to incline toward the rich air-fuel ratio side with respect to the target air-fuel ratio.

For the problem described above, according to this aspect, the F/B gain in the second F/B control is corrected by the gain correcting device depending on the learning value of the output characteristic of the oxygen centration sensor. For example, the extent and the trend of the change with time which occurs in the oxygen concentration sensor are quantitatively or potentially determined on the basis of a learning history of the output characteristic of the oxygen concentration sensor, and the F/B gain is set to suppress the inclination of the air-fuel ratio as described above, depending on the extent of the decrease in sensitivity. For example, as a preferred form, the aspect of the correcting the F/B gain is differentiated between the case where the output value is on the rich air-fuel ratio side in comparison with the target output value and the case where the output value is on the lean air-fuel ratio side.

Therefore, according to this aspect, even if the sensitivity of the oxygen concentration sensor decreases, the air-fuel ratio of the gas flowing into the three way catalyst can be preferably maintained at the target air-fuel ratio.

In another aspect of the control apparatus for the internal combustion engine of the present invention, further comprising an output value correcting device configured to correct the output value according to the learning value (Claim 6).

According to this aspect, instead of correcting the F/B gain associated with the second F/B control as in the aforementioned aspect, the output value of the oxygen concentration sensor itself is corrected by the output value correcting device. In other words, even if there is the decrease in sensitivity of the oxygen concentration sensor due to the change with time, the output value at that time point can be converted into the output value before the decrease in sensitivity becomes obvious, for example, on the basis of the maximum output value detected in a past learning process, or the like.

Therefore, as in the case where the F/B gain is corrected as described above, it is prevented that the second F/B control is mistakenly processed, and the air-fuel ratio of the gas flowing into the three way catalyst can be preferably maintained at the target air-fuel ratio by using the control of the fuel injection amount by the first F/B control.

The operation and other advantages of the present invention will become more apparent from embodiments explained below.

MODES FOR CARRYING OUT THE INVENTION

Embodiments of the Invention

Hereinafter, various embodiments of the present invention will be explained with reference to the drawings.

First Embodiment

Configuration of Embodiment

Figure 1:
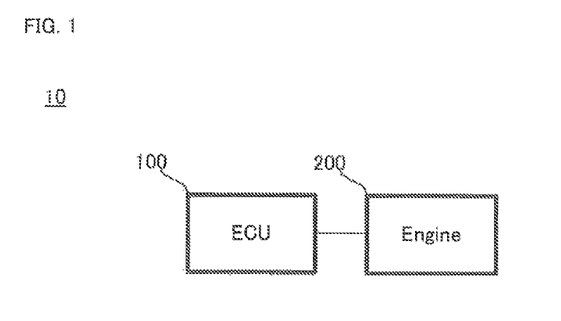
FIG. 1 is a schematic configuration diagram conceptually illustrating a configuration of an engine system in a first embodiment of the present invention.

Firstly, with reference to FIG. 1, a configuration of an engine system 10 in a first embodiment of the present invention will be explained. FIG. 1 is a schematic configuration diagram conceptually illustrating the configuration of the engine system 10.

In FIG. 1, the engine system 10 is mounted on a not-illustrated vehicle, and is provided with an ECU 100 and an engine 200.

The ECU 100 is provided with a central processing unit (CPU), a read only memory (ROW a random access memory (RAM), and the like. The ECU 100 is an electronic control unit configured to control the operation of the engine system 10, and is one example of the "control apparatus for the internal combustion engine" of the present invention. The ECU 100 is configured to perform various controls in accordance with a control program stored in the ROM.

The ECU 100 is an integral electronic control unit which can function as one example of each of the "first F/B controlling device", the "second F/B controlling device", the "learning device", the "target value setting device", the "learning value correcting device" and the "upper limit, setting device" of the present invention; however, physical, mechanical, and electrical configurations of each device of the present invention are not limited to this example. Each device may be configured as various computer systems or the like, such as a plurality of ECUs, various processing units, various controllers, or microcomputer apparatuses.

Figure 2:
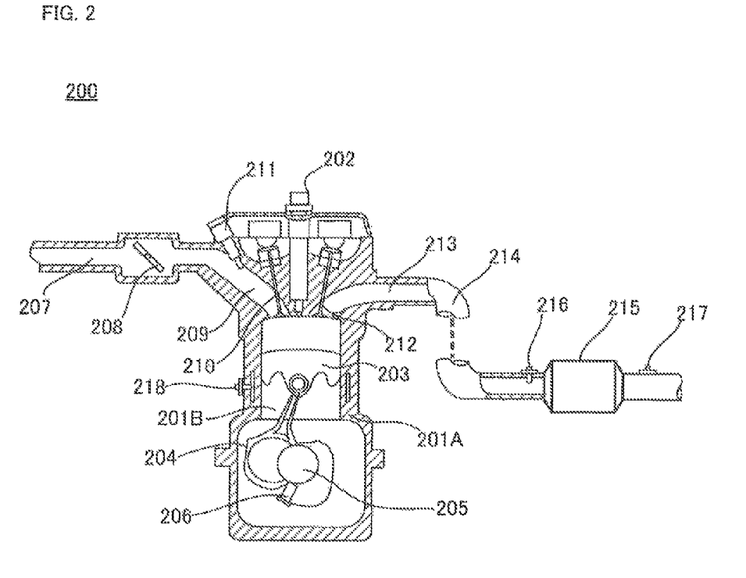
FIG. 2 is a schematic cross sectional view exemplifying a specific configuration of an engine in the engine system illustrated in FIG. 1.

The engine 200 is a multi-cylinder gasoline engine as one example of the "internal combustion engine" of the present invention. Now, with reference to FIG. 2, a detailed configuration of the engine 200 will be explained. FIG. 2 is a schematic cross sectional view exemplifying the specific configuration of the engine 200.

In FIG. 2, the engine 200 is provided with a cylinder 201B accommodated in a cylinder block 201A.

In a combustion chamber formed within the cylinder 201, one portion of an ignition plug (whose reference numeral is omitted) of an ignition apparatus 202 is exposed. The engine 200 has such a mechanism that a mixture of the air and fuel (hereinafter referred to as an air-fuel mixture) is ignited and burned by an ignition operation of the ignition plug in the process of being compressed in a compression stroke.

On the other hand, the reciprocating motion of a piston 203 generated according to explosive force associated with the combustion of the air-fuel mixture is converted to rotational motion of a crankshaft 205 via a connecting rod 204, and it is used as power of the vehicle on which the engine 200 is mounted.

In the vicinity of the crankshaft 205, there is placed a crank position sensor 206 configured to detect a rotational position of the crankshaft 205 (i.e. a crank angle). The crank position sensor 206 is electrically connected to the ECU 100. The detected crank angle of the engine 200 is referred to by the ECU 100 with a regular or irregular period, and is used, for example, for calculation of the number of engine revolutions NE and the other controls.

Incidentally, the engine 200 is an in-line four-cylinder engine in which four cylinders 201B are arranged in line in a perpendicular direction to the paper; however, the structures of the individual cylinders 201B are equal to each other, so that an explanation will be given to only one cylinder 201B in FIG. 2. Moreover, the illustrated configuration is merely one example which can be adopted by the "internal combustion engine" of the present invention.

In the engine 200, the air sucked from the exterior is purified by a not-illustrated cleaner and then supplied to an intake tube 207. In the intake tube 207, a throttle valve 208 configured to adjust an intake air amount of the intake air is disposed. The throttle valve 208 is configured as a type of electronically controlled throttle valve in which a drive state thereof is controlled by a not-illustrated, throttle valve motor which is electrically connected to the ECU 100.

The ECU 100 controls the drive of the throttle valve motor basically to obtain a throttle opening degree Thr according to an accelerator opening degree Ta which is detected by a not-illustrated accelerator position sensor. The ECU 100 can also adjust the throttle opening degree without a driver's intention via the operation control of the throttle valve motor.

The intake air appropriately adjusted by the throttle valve 208 is mixed with fuel injected from an intake port injector 211 in an intake port 209 corresponding to each cylinder 201B, to make the aforementioned air-fuel mixture. Gasoline as the fuel is stored in a not-illustrated fuel tank, and is force-fed to the intake port injector 211 via a not-illustrated delivery pipe by the operation of a not-illustrated low pressure feed pump.

The intake port injector 211 has a not-illustrated fuel injection valve and is configured to inject to the intake port an amount of the fuel according to a fuel injection period TAU corresponding to a valve opening period of the fuel injection valve. A not-illustrated drive apparatus for driving the fuel injection valve is electrically connected to the ECU 100, and the operation thereof is controlled by the ECU 100.

A communication state between the inside of the cylinder 201B and the intake port 209 is controlled by the opening and closing of an intake valve 210. In other words, the aforementioned air-fuel mixture is sucked into the cylinder 201B in a valve opening period of the intake valve 210. The air-fuel mixture which is burned within the cylinder 201B becomes an exhaust gas, and is supplied to an exhaust tube 214 via an exhaust port 213 in the opening of an exhaust valve 212 which opens and closes in conjunction with the opening and closing of the intake valve 210. The exhaust tube 214 is one example of the "exhaust passage" of the present invention.

In the exhaust tube 214, there is placed a three way catalyst 215 as one example of the "three way catalyst" of the present invention. The three way catalyst 215 is configured such that noble metal such as platinum is supported by a catalyst support, and is configured to purify the exhaust gas by performing the oxidation combustion of HC and CO and the reduction of nitrogen oxide NOx at substantially the same time. Moreover, the three way catalyst 215 is configured to adsorb oxygen by the operation of ceria ($CeO_2$) supported by the catalyst support. In other words, if an inflow gas is at a lean air-fuel ratio, the reduction of NOx is accelerated due to the adsorption of one portion of excessive oxygen. On the other hand, if the inflow gas is at a rich air-fuel ratio, the oxidation of HC and CO is accelerated due to the desorption of the adsorbed oxygen.

On the upstream side of the three way catalyst 215 in the exhaust tube 214, there is placed an air-fuel ratio sensor 216 configured to detect an air-fuel ratio A/F of a gas flowing into the three way catalyst 215.

The air-fuel ratio sensor 216 is, for example, a limiting-current-type wide-range air-fuel ratio sensor provided with a diffusion resistance layer, and is one example of the "air-fuel ratio sensor" of the present invention. Incidentally, the gas flowing into the three way catalyst 215 means the exhaust gas which is emitted from each cylinder 201B to the exhaust port 213 corresponding to each cylinder, which is collected in a not-illustrated exhaust manifold, and which is then supplied to the exhaust tube 214.

The air-fuel ratio sensor 216 is a sensor configured to output an output voltage value Vaf according to the air-fuel ratio A/F. In other words, the air-fuel ratio sensor 216 is configured to detect the air-fuel ratio A/F indirectly from a voltage value which has a unique relation with the air-fuel ratio A/F.

The output voltage value Vaf matches a reference output voltage value Vst when the air-fuel ratio A/F is at the theoretical air-fuel ratio. The output voltage value Vaf is less than the reference output voltage value Vst if the air-fuel ratio A/F is on the rich air-fuel ratio side, and is greater than the reference output voltage value Vst if the air-fuel ratio A/F is on the lean air-fuel ratio side. In other words, the output voltage value Vaf continuously changes with respect to a change in the air-fuel ratio A/F. The air-fuel ratio sensor 216 is electrically connected to the ECU 100, and the detected output voltage value Vaf is referred to by the ECU 100 with a regular or irregular period.

On the downstream side of the three way catalyst 215 of the exhaust tube 214, there is placed an $O_2$ sensor 217 configured to detect an oxygen concentration Coxs of a gas which has passed through the three way catalyst 215 (hereinafter expressed as a "catalyst emission gas"). The $O_2$ sensor 217 is a known electromotive force type oxygen concentration (i.e. concentration cell type oxygen concentration sensor using stabilized zirconia). Incidentally, the catalyst emission gas is desirably equivalent to a gas flowing into a downstream-side catalyst (which is normally the three way catalyst but has a different noble metal support ratio from that of the three way catalyst 215) disposed on the downstream side of the three way catalyst 215.

The $O_2$ sensor 217 is a sensor configured to output an output voltage value Voxs (i.e. one example of the "output value" of the present invention) according to the oxygen concentration Coxs of the catalyst emission gas. In other words, the $O_2$ sensor 217 is configured to detect the oxygen concentration indirectly from a voltage value which has a unique relation with the oxygen concentration.

The output voltage value Voxs of the $O_2$ sensor 217 matches a reference output voltage value Voxsb (e.g. about 0.5 V) if the air-fuel ratio of the catalyst emission gas is the theoretical air-fuel ratio (in other words, if the oxygen concentration Coxs of the catalyst emission gas is a reference oxygen concentration Coxsb corresponding to the theoretical air-fuel ratio). Moreover, the output voltage value Voxs is greater than the reference output voltage value Voxsb if the air-fuel ratio of the catalyst emission gas is on the rich air-fuel ratio side with respect to the theoretical air-fuel ratio, and is less than the reference output voltage value Voxsb if the air-fuel ratio is on the lean air-fuel ratio side.

More specifically, if the air-fuel ratio of the catalyst emission gas is between the theoretical air-fuel ratio and a rich-side detection limit air-fuel ratio, the output voltage value Voxs of the $O_2$ sensor 217 increases substantially linearly to a maximum output voltage value Voxsmax (e.g. about 0.9 V) corresponding to the rich-side detection limit air-fuel ratio in association with a decrease in the air-fuel ratio (i.e. a decrease in the oxygen concentration Coxs). In an air-fuel ratio area which is richer than the rich-side detection limit air-fuel ratio, the output voltage value Voxs is substantially constant at the maximum output voltage value Voxsmax.

Moreover, if the air-fuel ratio of the catalyst emission gas is between the theoretical air-fuel ratio and a lean-side detection limit air-fuel ratio, the output voltage value Voxs of the $O_2$ sensor 217 decreases substantially linearly to a minimum output voltage value Voxsmin (e.g. about 0.1 V) corresponding to the lean-side detection limit air-fuel ratio in association with an increase in the air-fuel ratio (i.e. an increase in the oxygen concentration Coxs). In an air-fuel ratio area which is leaner than the lean-side detection limit air-fuel ratio, the output voltage value Voxs is substantially constant at the minimum output voltage value Voxsmin.

Incidentally, the $O_2$ sensor 217 is electrically connected to the ECU 100, and the detected output voltage value Vox is referred to by the ECU 100 with a regular or irregular period.

In the engine 200, in a water jacket disposed to surround the cylinder block 201A, there is placed a coolant temperature sensor 218 configured to detect a coolant temperature Tw associated with a coolant (LLC) which is circulated and supplied to cool the engine 200. The coolant temperature sensor 218 is electrically connected to the ECU 100, and the detected coolant temperature Tw is referred to by the ECU 100 with a regular or irregular period.

<Operation of Embodiment>
<Outline of Air-Fuel Ratio F/B Control>

In the engine 200, a fuel injection amount Q of the intake port injector 211 is controlled by air-fuel ratio F/B control performed by the ECU 100 at all times in an operating period of the engine 200.

The air-fuel ratio F/B control in the embodiment is established from main F/B control and sub F/B control. The main F/B control is to control the fuel injection amount such that the air-fuel ratio A/F obtained on the basis of the output voltage value Vaf of the air-fuel ratio sensor 216 converges to a target air-fuel ratio A/Ftg. The sub F/B control is to calculate a correction amount of the output voltage value Vaf of the air-fuel ratio sensor 216 such that the output voltage value Voxs of the $O_2$ sensor 217 converges to a target output voltage value Voxstg.

In other words, the main F/B control in the embodiment is one example of the "first F/B control" of the present invention, and the sub F/B control in the embodiment is one example of the "second F/B control" of the present invention.

<Details of Main F/B Control>

Hereinafter, the details of the main F/B control will be explained.

Firstly, the ECU 100 calculates a F/B control output voltage value Vafc according to the following equation (1). Incidentally, in the equation, Vaf means an output voltage value of the aft-fuel ratio sensor 216, Vfbs means a sub F/B controlled variable described later, and Vfbsg means a sub F/B learning value described later.

$$Vafc = Vaf + Vfbs + Vfbsg \quad (1)$$

After obtaining the F/B control output voltage value Vafc, the ECU 100 refers to a conversion map stored in the ROM in advance and converts the F/B control output voltage value Vafc to an F/B control air-fuel ratio A/Fc.

On the other hand, the ECU 100 obtains an in-cylinder intake air amount Mc of an intake air sucked into the cylinder 201B. The in-cylinder intake air amount Mc is calculated on the basis of an intake air amount Ga detected by an airflow meter not illustrated in FIG. 1 and the number of engine revolutions NE, in each intake stroke of each cylinder. Incidentally, various known methods can be applied to a method of calculating the in-cylinder intake air amount Mc.

After obtaining the in-cylinder intake air amount Mc, the ECU 100 obtains a basic fuel injection amount Qb by dividing the in-cylinder intake air amount Mc by the target air-fuel ratio A/Ftg at that time point. After obtaining the basic fuel injection amount Qb, the ECU 100 obtains the final fuel injection amount Q to be injected from the fuel injection valve of the intake port injector 211 according to the following equation (2).

$$Q = Qb \cdot KG \cdot FAF \quad (2)$$

Here, FAF in the equation means a main F/B controlled variable updated by the main F/B control as occasion demands, and KG means a main F/B learning value (or a learning value about FAF).

The main F/B controlled variable FAF is calculated on the basis of a main F/B value DF. The main F/B value DF is obtained in the following manner.

The ECU 100 obtains an in-cylinder fuel supply amount Qcn, which is the amount of fuel supplied to the combustion chamber 201B at a time point N cycles (i.e. N×720 degrees CA in the embodiment) before a current time point, by dividing an in-cylinder intake air amount Mcn at the time point N cycles before the current time point by the aforementioned F/B control air-fuel ratio A/Fc.

Incidentally, the value "N cycles before the current time point" is used because it takes a time corresponding to the N cycles, for the air-fuel mixture which is used for a combustion process in the combustion chamber, to reach the air-fuel ratio sensor 216. In other words, the number of cycles N is obtained in advance, experimentally, experientially, or theoretically. The gas to which the air-fuel ratio sensor 216 is exposed is a gas mixed with the exhaust gas emitted from each cylinder to some degree.

Then, the ECU 100 obtains a target in-cylinder fuel supply amount Qcntg at the time point N cycles before the current time point, by dividing the in-cylinder intake air amount Mcn at the time point N cycles before the current time point, by the target air-fuel ratio A/Ftg at the time point N cycles before the current time point.

The ECU 100 sets a value obtained by subtracting the previously obtained in-cylinder fuel supply amount Qcn at the time point N cycles before the current time point, from the target in-cylinder fuel supply amount Qcntg at the time point N cycles before the current time point, as an in-cylinder fuel supply amount deviation DFc. The in-cylinder fuel supply amount deviation DFc indicates an excess and deficiency of the fuel supplied into the cylinder at the time point N cycles before the current time point. After the in-cylinder fuel supply amount deviation DFc is Obtained, the main F/B value DF is obtained according to the following equation (3).

$$DF = (Gp \cdot DFc + Gi \cdot SDFc) \cdot KFB \quad (3)$$

Here, Gp in the equation is a proportional gain, and Gi is an integral gain. Moreover, in the equation, a coefficient KFB is a design value and is set to "1" herein. The coefficient KFB, however, may be variable depending on the number of engine revolutions NE and the in-cylinder intake air amount Mc or the like. Furthermore, in the equation, SDFc is an integrated value of the in-cylinder fuel supply amount deviation DFc. In other words, the main F/B value DF is obtained by PI control which is a type of the known feedback control.

After obtaining the main F/B value DF, the ECU 100 obtains the main F/B controlled variable FAF according to the following equation (4).

$$FAF = (Qbn + DF)/Qbn \quad (4)$$

Qbn in the above equation (4) is a basic fuel injection amount at the time point N cycles before the current time point. In other words, the main F/B controlled variable FAF is a value obtained by the sum of the main F/B value DF and the basic fuel injection amount Qbn at the time point N cycles before the current time point by the basic fuel injection amount Qb at the time point N cycles before the current time point.

The main F/B controlled variable FAF obtained in this manner is multiplied by the basic fuel injection amount Qb in each predetermined update timing to calculate the final fuel injection amount Q. The above is the main F/B control in the air-fuel ratio F/B control.

Now, a main F/B leaning value KG will be explained. The main F/B leaning value KG is updated to bring the main F/B controlled variable FAF closer to a basic value "1".

More specifically, the ECU 100 obtains a weighted average value FAFAV of the main F/B controlled variable FAF according to the following equation (5) in timing of calculating the main F/B controlled variable FAF. In the equation, q is a design value which is greater than 0 and less than 1. Moreover, in the equation, (i) means a learning value at the latest time point, and (i−1) means a learning value one sampling time point before the current time point.

$$FAFAV(i) = q \cdot FAF + (1-q) \cdot FAFAV(i-1) \quad (5)$$

The ECU 100 increases the main F/B learning value KG by a preset correction amount X if the weighted average value FAFAV is greater than or equal to 1+α (where α is a design value which is greater than or equal to 0 and less than 1). On the other hand, the ECU 100 reduces the main F/B learning value KG by the correction amount X if the weighted average value FAFAV is less than or equal to 1+α. The ECU 100 does not update the main F/B learning value if the weighted average value FAFAV is between both values.

If the main F/B learning value KG is updated as occasion demands in the process of performing the air-fuel ratio F/B control as described above, the weighted average value FAFAV gradually converges between "1−α" and "1+α". Here, the number of times in which the weighted average value FAFAV is in this range in the update timing (the number of times in which the weighted average value FAFAV is not updated) is separately counted by the ECU 100 with a counter. If a count value exceeds a predetermined number, the ECU 100 determines that the main F/B learning value KG converges; namely, the ECU 100 determines that the learning is completed.

<Details of Sub F/B Control>

Next, a method of calculating a sub F/B controlled variable Vfbs used in the above equation (1) will be explained.

The ECU 100 subtracts the output voltage value Voxs from the target output voltage value Voxstg, which is a target value of the output voltage value Voxs of the $O_2$ sensor 217, in each predetermined update timing, thereby calculating an output voltage deviation DVoxs.

After obtaining the output voltage deviation DVoxs, the ECU 100 calculates the sub F/B controlled variable Vfbs according to the following equation (6). Incidentally, Kp, Ki and Kd in the equation are a proportional gain, an integral gain and a derivative gain, respectively. SDVoxs and DDVoxs are a time integrated value and a time derivative value of the deviation DVoxs, respectively.

$$Vfbs = Kp \cdot DVoxs + Ki \cdot SDVoxs + Kd \cdot DDVox \quad (6)$$

As described above, the ECU 100 performs PIC control, which is a type of the known feedback control, such that the output voltage value of the $O_2$ sensor 217 matches the target output voltage value Voxstg, in each predetermined update timing.

Now, a method of calculating a sub F/B learning value Vfbsg used in the above equation (1) will be explained. The ECU 100 updates the sub F/B learning value Vfbsg according to the following equation (7) every time the output voltage value Voxs of the $O_2$ sensor 217 crosses the target output voltage value Voxstg. Incidentally, (i) on the left side of the equation means a learning value at the latest time point, and (i−1) on the right side means a learning value one sampling time point before the current time point.

$$Vfbsg(i) = (1-p) \cdot Vfbsg(i-1) + p \cdot Ki \cdot SD\,Voxs \quad (7)$$

As described above, the sub F/B learning value Vfbsg is a value obtained by performing filtering for noise reduction on an integral term Ki·SDVoxs of the sub F/B controlled variable Vfbs. The sub F/B learning value Vfbsg is updated to be a value according to a stationary component of the sub F/B controlled variable Vfbs in each update timing.

In the equation (7), a value p is an arbitrary value which is greater than or equal to 0 and less than 1. Moreover, as is clear from the above equation (7), as the value p increases, the integral term is reflected in the sub F/B learning value Vfbsg, more significantly. In other words, as the value p increases, an updating speed of the sub F/B learning value Vfbsg increases.

As described above, in the air-fuel ratio F/B control in the embodiment, the output voltage value Vaf of the air-fuel ratio sensor 216 is corrected by the sum of the sub F/B controlled variable Vfbs and the sub F/B learning value Vfbsg, and the F/B control air-fuel ratio A/Fc is obtained on the basis of the F/B control output voltage value Vafc obtained by the correction. Then, the basic fuel injection amount Qb is corrected such that the obtained F/B control air-fuel ratio A/Fc matches the target air-fuel ratio A/Ftg. As a result, the air-fuel ratio A/F of the gas flowing into the three way catalyst 215 converges to its target value A/Ftg, and the output voltage value Voxs of the $O_2$ sensor 217 converges to its target value, i.e. the target output voltage value Voxstg.

Incidentally, the embodiment exemplifies an aspect in which the air-fuel ratio A/F obtained on the basis of the output value Vaf of the air-fuel ratio sensor 216 is corrected to the control air-fuel ratio A/Fc, as an operation example of the "first F/B controlling device" of the present invention; however, this is, of course, one example.

For example, the ECU 100 may correct the target air-fuel ratio A/Ftg of the main F/B control, on the basis of a deviation between the output voltage value Voxs of the $O_2$ sensor 217 and the target output voltage value Voxsmax. In this case, if the air-fuel ratio on the downstream side of the three way catalyst 215 which is alternatively detected by the $O_2$ sensor 217 is richer than the target air-fuel ratio corresponding to the target output voltage value Voxstg, the target air-fuel ratio A/Ftg of the main F/B control is corrected to the lean air-fuel ratio side. As a result, in the main F/B control for matching the air-fuel ratio A/F obtained on the basis of the output value of the air-fuel ratio sensor 216 with the target air-fuel ratio A/Ftg, the fuel injection amount Q is corrected to the reduction side, and the output voltage value Voxs of the $O_2$ sensor 217 also converges to the target output voltage value Voxstg in the process in which the air-fuel ratio A/F converges to the target air-fuel ratio A/Ftg.

On the other hand, if the air-fuel ratio on the downstream side of the three way catalyst 215 which is alternatively detected by the $O_2$ sensor 217 is leaner than the target air-fuel ratio corresponding to the target output voltage value Voxstg, the target air-fuel ratio A/Ftg of the main F/B control is corrected to the rich air-fuel ratio side. As a result, in the main F/B control for matching the air-fuel ratio A/F obtained on the basis of the output value of the air-fuel ratio sensor 216 with the target air-fuel ratio A/Ftg, the fuel injection amount Q is corrected to the increase side, and the output voltage value Voxs of the $O_2$ sensor 217 also converges to the target output voltage value Voxstg in the process in which the air-fuel ratio A/F converges to the target air-fuel ratio A/Ftg.

<Outline of Sub F/B Compensation Control>

As described above, in the engine system 10, a possible range of the target air-fuel ratio A/Ftg of the air-fuel ratio F/B control depends on the target output voltage value Voxtg of the $O_2$ sensor 217 disposed on the downstream side of the three way catalyst 215.

Here, the target output voltage value Vosxtg of the $O_2$ sensor 217 needs to be set in an area in which the output voltage value Voxs changes substantially linearly with respect to the oxygen concentration Coxs on the downstream side of the three way catalyst 215, due to the nature of the sub F/B control described above.

On the other hand, it is clear in the three way catalyst 215 that the sensitivity of various emissions containing HC, CO and NOx decreases (i.e. emission robustness improves) in an atmosphere in which the air-fuel ratio is slightly richer than the theoretical air-fuel ratio. Thus, if the three way catalyst 215 is used in a condition of the highest exhaust gas purification efficiency, the target air-fuel ratio A/Ftg in the main air-fuel ratio F/B control needs to be set on the slightly rich air-fuel ratio side. In other words, the target output voltage value Voxstg of the $O_2$ sensor 217 needs to be set on a higher voltage side than the reference output voltage value Voxsb corresponding to the theoretical air-fuel ratio.

There is, however, the inherent or acquired individual difference in the sensitivity of the $O_2$ sensor as described above. If there is no mechanism for eliminating an influence of such an individual difference in real time, the target output voltage value needs to be limited by a limiting value in consideration of the worst case. The "worst case" described herein means, for example, a case where a sensor originally has poor detection sensitivity and where the extent of time degradation is high, and means a case where there is little oxygen concentration detectable area on a rich air-fuel ratio side which is richer than the theoretical air-fuel ratio, or similar cases.

The limitation as described above is an unnecessary measure for a sensor having practically sufficient oxygen concentration detection accuracy under the slightly rich air-fuel ratio atmosphere, and this may cause a situation in which the exhaust gas purification efficiency cannot be improved although it can be potentially further improved. In the engine system 10 in the embodiment, such a problem is solved by learning control and sub F/B compensation control performed by the ECU 100.

The learning control is configured to eliminate the influence of the individual difference among the sensors described above by learning an output characteristic of the $O_2$ sensor 217 in each predetermined timing to comprehend an oxygen concentration detection capability of the $O_2$ sensor 217 at all times. Moreover, the sub F/B compensation control is configured to accurately set the target output voltage value Voxstg of the $O_2$ sensor 217 by using a learning result of the output characteristic from the learning control.

<Details of Learning Control>

Figure 3:
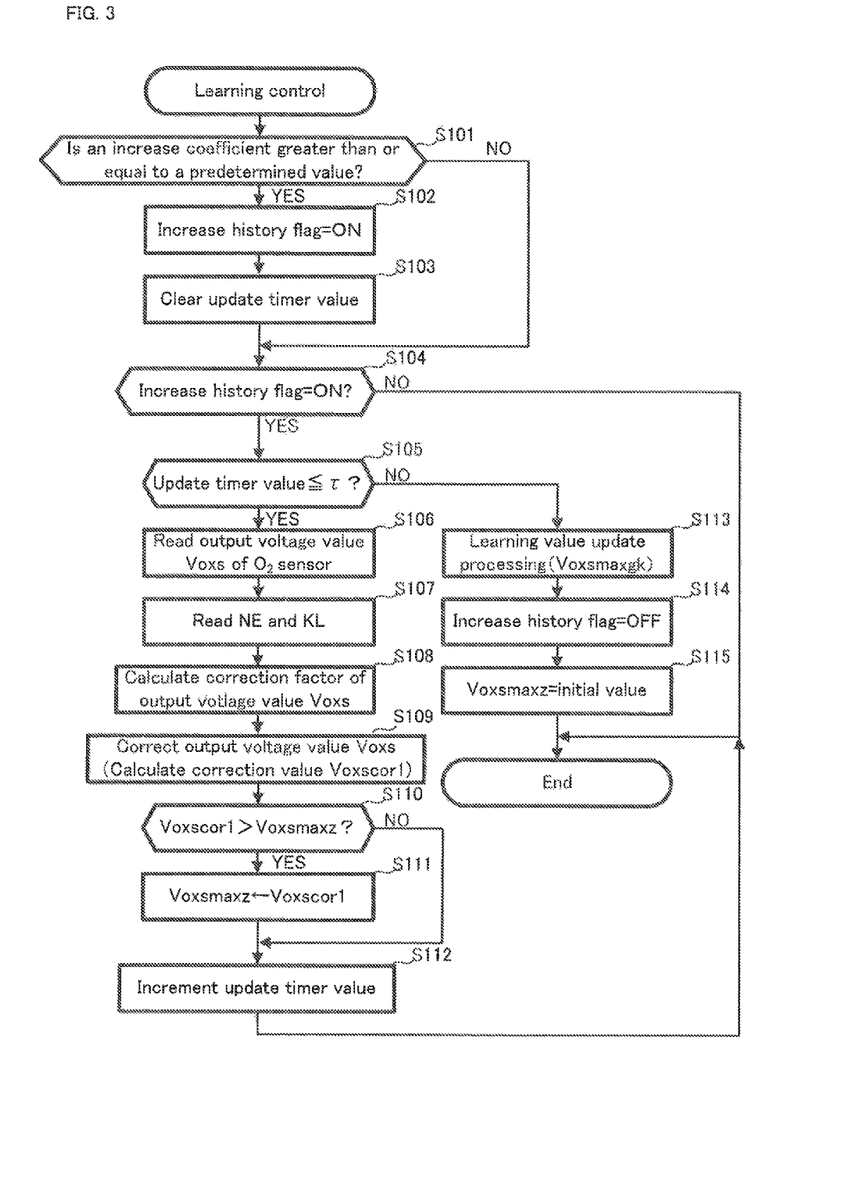
FIG. 3 is a flowchart illustrating learning control performed by an ECU in the engine system illustrated in FIG. 1.

Now, with reference to FIG. 3, the details of the learning control will be explained. FIG. 3 is a flowchart illustrating the learning control.

In FIG. 3, the ECU 100 determines whether or not an increase coefficient of the fuel injection amount Q is greater than or equal to a predetermined value (step S101). The increase coefficient is a correction factor by which the fuel injection amount Q determined by the main F/B control described above is multiplied, and is normally "1". On the other hand, if a predetermined condition for increasing the fuel injection amount is satisfied, the increase coefficient becomes greater than 1, and the fuel injection amount Q is temporarily increased. In the embodiment, the predetermined value in the step S101 is assumed to be a value of about "1.05".

Incidentally, as a situation in which the fuel injection amount Q is increased as described above, fuel increase control is assumed which is to quickly bring a lean air-fuel ratio atmosphere in the vicinity of the three way catalyst 215 dose to the target air-fuel ratio when returning from fuel-cut (F/C) performed upon vehicle deceleration. The determination process in the step S101 is to determine whether an atmosphere on the downstream side of the three way catalyst 215 is in a situation in which the air-fuel ratio is forcibly set rich to the extent that the learning can be preferably performed. As long as it is consistent with the purpose, a possible range of the predetermined value and a situation in which the fuel is increased are arbitrary. If the increase coefficient is less than the predetermined value (the step S101: NO), the process is moved to a step S104.

If the increase coefficient is greater than or equal to the predetermined value (the step S101: YES), the ECU 100 sets an increase history flag to "ON" (step S102) and clears an update timer value (step S103). The increase history flag is a flag indicating that the fuel injection amount Q is increased. Moreover, the update timer value is a value of a counter configured to count an elapsed time after the increase in the fuel injection amount Q. In other words, if the increase in the fuel injection amount is detected, the count of the elapsed time is immediately started. If the step S103 is performed, the process is moved to the step S104.

In the step S104, it is determined whether or not the increase history flag is set to "ON". If the increase history flag is "OFF" (the step S104: NO), the learning control is ended. Incidentally, the learning control is repeated with a predetermined period. A predetermined time after the end, the learning control is started again from the step S101.

If the increase history flag is "ON" (the step S104: YES), the ECU 100 determines whether or not the update timer value is a reference value τ (step S105). The reference value τ is sufficiently larger than a time value required for the atmosphere in which the air-fuel ratio atmosphere is set rich by the increase in the fuel injection amount, to actually reach the $O_2$ sensor 217. In other words, the reference value τ is a time value large enough for the output voltage value Voxs of the $O_2$ sensor 217 to indicate the maximum output voltage value Voxsmax for defining the detection limit on the rich air-fuel ratio side.

If the update timer value is less than or equal to the reference value τ (the step S105: YES), the ECU 199 reads the output voltage value Voxs of the $O_2$ sensor 217 in the RAM (step S106). Then, the ECU 100 reads the number of engine revolutions NE and a load factor KL of the engine 200 (step S107). The load factor KL is a value indicating a current load ratio with respect to a maximum engine load of the engine 200. For example, a relevant value is read from a load factor map which uses the intake air amount Ga detected by an airflow meter not illustrated in FIG. 2 and the number of engine revolutions NE as parameters.

After reading the number of engine revolutions NE and the load factor KL, the ECU 100 obtains a correction factor for correcting the output voltage value Voxs of the $O_2$ sensor 217 (step S108). For the correction factor, a relevant value is selected from a correction factor map stored in the ROM.

After the correction factor is obtained, the output voltage value Voxs is corrected by multiplying the output voltage value Voxs by the obtained correction factor, thereby to calculate a correction value Voxscor1 (step S109).

Figure 4:
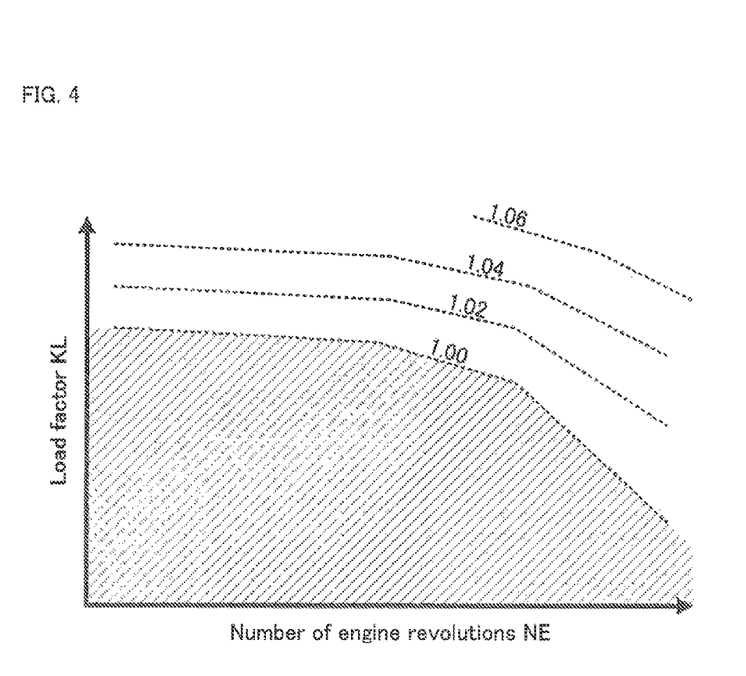
FIG. 4 is a conceptual diagram illustrating a correction factor map referred to in the learning control illustrated in FIG. 3.

Now, with reference to FIG. 4, the correction factor will be explained. FIG. 4 is a conceptual diagram illustrating the correction factor map.

In FIG. 4, the correction factor is defined on a two-dimensional plane which uses the number of engine revolutions NE and the load factor KL as axial elements. A hatched area in the drawing is a non-correction area in which the correction factor is "1", i.e. a non-correction area in which the output voltage value Voxs is not corrected.

Here, the number of engine revolutions NE and the load factor KL are used as alternative values of exhaust gas temperature of the engine 200. In other words, as the number of engine revolutions NE increases, or as the load factor KL increases, combustion temperature within the cylinder 201B increases, and thus, the exhaust gas temperature increases. The aforementioned non-correction area is an area in which the exhaust gas temperature is supposedly relatively high. On the other hand, as the load factor KL increases, or as the number of engine revolutions NE increases, the correction factor changes as illustrated. In other words, as a condition becomes favorable for the exhaust gas temperature being supposedly high, the correction factor increases. This takes into account that detection accuracy of the $O_2$ sensor 217 decreases if a sensor terminal of the $O_2$ sensor 217 is exposed in a high-temperature atmosphere.

In the correction factor map, a relation corresponding to FIG. 4 is quantified and stored. The ECU 10 can select the relevant value from the engine revolutions NE and the load factor KL at that time point. The accuracy of the exhaust gas temperature estimated on the basis of the load factor KL and the number of engine revolutions NE obviously tends to be low in comparison with direct temperature detection by a temperature sensor or the like. Considering the implication of correcting the detection accuracy of the $O_2$ sensor 217, however, the estimation result based on the alternative element values can be used without a problem. Moreover, in the case of the configuration in which the alternative element values area used as described above, it is not necessary to separately dispose a sensor configured to detect the exhaust gas temperature, which is useful in cost.

Back in FIG. 3, after calculating the correction value Voxscor1, the ECU 100 determines whether or not the correction value Voxscor1 is greater than a provisional maximum output voltage value Voxsmaxz of the $O_2$ sensor 217 stored in the RAM at that time point (step S110). If the correction value Voxscor1 is greater than the provisional maximum output voltage value Voxsmaxz (the step S110: YES), the ECU 100 rewrites the provisional maximum output voltage value Voxsmaxz with the correction value Voxscor1 (step S111). If the provisional maximum output voltage value Voxsmaxz is written with the correction value Voxscor1, or if the correction value Voxscor1 is less than or equal to the provisional maximum output voltage value Voxsmaxz (the step S110: NO), the ECU 100 increments the update timer value by a predetermined value (step S112) and ends the process. In a learning period in which the update timer value is less than or equal to the reference value τ, the process is repeated from the step S101 with a predetermined period. As a result, the maximum value of the output voltage value Voxs of the $O_2$ sensor 217 is stored in the RAM of the ECU 100

On the other hand, in the step S105, if the update timer value is greater than the reference value τ (the step S105: NO), the ECU 100 performs learning value updating (step S113). The learning value updating is a process of updating the maximum value of the output voltage value Voxs stored in the RAM at that time point as a latest maximum output voltage learning value Voxsmaxgk.

After the learning value updating is ended, the ECU 100 sets the increase history flag to "OFF" (step S114), and sets the provisional maximum output voltage value Voxsmaxz to an initial value (e.g. 0.65 V) (step S115). After the provisional maximum output voltage value Voxsmaxz is returned to the initial value, the learning control is ended. The learning control is performed in the above manner.

Incidentally, in the embodiment, the maximum output voltage value of the $O_2$ sensor 217 is learned as one example of the "output characteristic" of the present invention as described above. How to extract the output value from the $O_2$ sensor 217 is a design matter. For example, the system may be formed such that the output voltage value Voxs is inverted and such that the output voltage value decreases as the oxygen concentration Coxs on the downstream side of the three way catalyst 215 increases. In such a configuration, the minimum output voltage value of the $O_2$ sensor 217 may be learned as one example of the "output characteristic" of the preset invention.

Alternatively, the $O_2$ sensor may be configured not such that the output value is inverted as described above, but such that the output voltage value decreases as the oxygen concentration Coxs on the downstream side of the three way catalyst 215 increases. Even in this case, the minimum output voltage value of the O₂ sensor is preferably learned.

<Details of Sub F/B Compensation Control>

Figure 5:
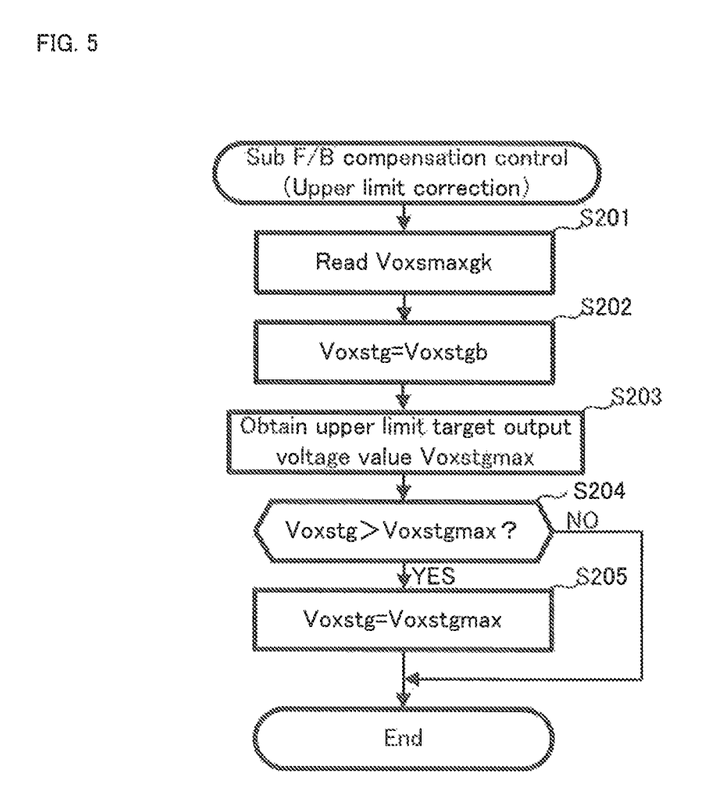
FIG. 5 is a flowchart illustrating sub F/B compensation control performed by the ECU in the engine system illustrated in FIG. 1.

Next, with reference to FIG. 5, the details of the sub F/B compensation control will be explained. FIG. 5 is a flowchart illustrating the sub F/B compensation control.

In FIG. 5, the ECU 100 reads the maximum output voltage learning value Voxsmaxgk updated by the learning control (step S201). The ECU 100 then sets the target output voltage value Voxstg, which is the target value of the O₂ sensor 217 in the sub FM control, to a reference target output voltage value Voxstgb (step S202). The reference target output voltage value Voxstgb is a value corresponding to the slightly rich air-fuel ratio at which the exhaust gas purification efficiency of the three way catalyst 215 described above is the maximum or near the maximum, and it is, for example, a value of about 0.75 V.

The ECU 100 then refers to an upper limit target output voltage value map stored in the ROM in advance and obtains an upper limit target output voltage value Voxstgmax of the O₂ sensor 217 (step S203).

Figure 6:
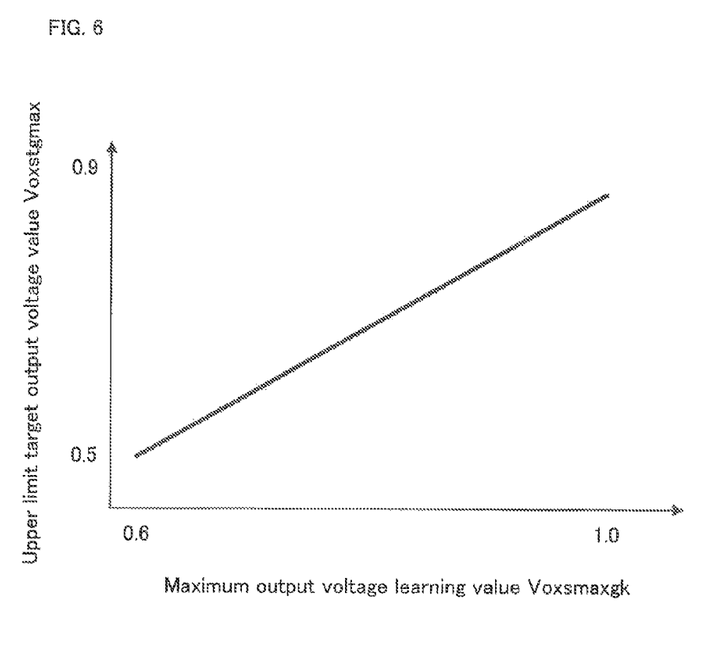
FIG. 6 is a conceptual diagram illustrating an upper limit target output voltage value map referred to in the sub F/B compensation control illustrated in FIG. 3.

Now, with reference to FIG. 6, the details of the upper limit target output voltage value map will be explained. FIG. 6 is a conceptual diagram illustrating the upper limit target output voltage value map.

As exemplified in FIG. 6, the upper limit target output voltage value Voxstgmax has a linear relation of increasing or decreasing with respect to an increase or decrease in the maximum output voltage learning value Voxsmaxgk.

More specifically, the upper limit target output voltage value Voxstgmax is a value obtained by subtracting a margin value corresponding to about several to several tens % of the maximum output voltage learning value Voxsmaxgk, from the maximum output voltage learning value Voxsmaxgk. In other words, the upper limit target output voltage value Voxstgmax is a value which is less than the maximum output voltage learning value Voxsmaxgk. This is a measure to ensure reliability of the sub F/B control on a richer air-fuel ratio side compared to the target output voltage value, if the upper limit target output voltage value Voxstgmax is set as an actual target output voltage value. The upper limit target output voltage value map stores therein a quantified relation corresponding to FIG. 6, and the ECU 100 can selectively obtain a relevant value, as occasion demands.

Back in FIG. 5, the ECU 100 determines whether or not the target output voltage value Voxstg set in the step S202 (the reference target output voltage value Voxstgb in the initial state) is greater than the upper limit target output voltage value Vxostgmax obtained in the step S203 (step S204). If the target output voltage value Voxstg is less than or equal to the upper limit target output voltage value Vxostgmax (the step S204: NO), the ECU 100 ends the sub F/B compensation control.

On the other hand, if the target output voltage value Voxstg is greater than the upper limit target output voltage value Vxostgmax (the step S204: YES), the ECU 100 limits the target output voltage value Voxstg by using the upper limit target output voltage value Voxstgmax, and newly sets the upper limit target output voltage value Voxstgmax as the target output voltage value Voxstg (step S205). If the step S205 is performed, the sub F/B compensation control is ended. The sub F/B compensation control is performed in the above manner. As in the learning control, the sub F/B compensation control is also is repeated with a predetermined period.

As explained above, according to the embodiment, the target output voltage value Voxsmax in the sub F/B control is set by the sub F/B compensation control on the basis of the maximum output voltage value Voxsmax of the O₂ sensor 217 which is learned in real time by the learning control. Thus, there is no need to take into account the individual difference among the sensors, and the oxygen concentration detection capability of the O₂ sensor 217 can be used for the sub F/B control as significantly as possible at all times. In other words, the atmosphere in the three way catalyst 215 can be maintained at the slightly rich air-fuel ratio in which the exhaust gas purification efficiency is always the best, and the exhaust gas purification efficiency of the engine 200 can be improved.

Second Embodiment

Figure 7:
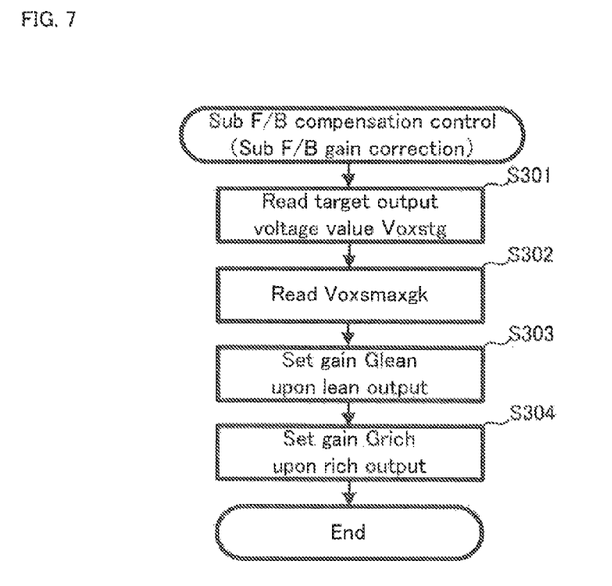
FIG. 7 is a flowchart illustrating sub F/B compensation control in a second embodiment of the present invention.

Next, with reference to FIG. 7, sub F/B compensation control in a second embodiment of the present invention will be explained. FIG. 7 is a flowchart illustrating the sub F/B compensation control in the second embodiment.

The sub F/B compensation control in the second embodiment is configured to compensate the accuracy of the sub F/B control if there is a decrease in sensitivity in the O₂ sensor 217 due to a change with time. In other words, in the embodiment, the ECU 100 functions as one example of the "gain correcting device" of the present invention.

In FIG. 7, the ECU 100 reads the target output voltage value Voxstg (step S301). The ECU 100 then reads the maximum output voltage learning value Voxsmaxgk (step S302).

After reading those values, the ECU 100 sets a sub F/B gain Glean when the output voltage value Voxs of the O₂ sensor 217 is on a leaner air-fuel ratio side compared to the target output voltage value Voxstg, according to the following equation (8) (step S303). In the equation, "Gleanb" is a basic value of a sub F/B gain, and means each gain of the proportional gain Kp, the integral gain Ki and the derivative gain Kd in the equation (6).

$$Glean = Gleanb * Voxstgb / Voxstg \tag{8}$$

According to the above equation (8), while the target output voltage value Voxstg of the O₂ sensor 217 is the reference target output voltage value Voxstgb, the sub F/B gain Glean is maintained at the basic sub F/B gain Gleanb. Moreover, if the target output voltage value Voxstg decreases lower than the reference target output voltage value Voxstgb in the process of learning the maximum output voltage value Voxsma, the sub F/B gain Glean is corrected to be greater than the basic sub F/B gain Gleanb according to the extent of the decrease.

After ending the gain setting on the lean air-fuel ratio side, the ECU 100 sets a sub F/B gain Grich when the output voltage value Voxs of the O₂ sensor 217 is on a richer air-fuel ratio side compared to the target output voltage value Voxstg, according to the following equation (9) (step S304). In the equation, "Grichb" is a basic value of the sub F/B gain, and means each gain of the proportional gain Kp, the integral gain Ki and the derivative gain Kd in the equation (6). Moreover, "Voxsmaxb" in the equation is a reference maximum output voltage value of the O₂ sensor 217, and it is, for example, a fixed value of about 0.95 V.

$$Grich = Grichb * (Voxstgb - Voxsmaxb) / (Voxstg - Voxsmaxgk) \tag{9}$$

According to the above equation (9), if there is no change with time in the O₂ sensor 217, the reference maximum output voltage value Voxsmasb substantially matches the maximum output voltage learning value Voxsmaxgk, and thus, a denominator substantially matches a numerator in a correction term by which a basic sub F/B gain Grich is multiplied on the right side of the equation. In other words, the sub F/B gain Grich is maintained at the basic sub F/B Grichb.

Moreover, if there is the decrease in sensitivity in the O$_2$ sensor 217 due to the change with time in the process of learning the maximum output voltage value Voxsmax and the maximum output voltage learning value Voxsmaxgk starts to decrease, the denominator gradually decreases. Incidentally, as exemplified in FIG. 5, the maximum output voltage learning value Voxsmaxgk is never equal to the upper limit target output voltage value Voxstgmax, and the both values keep a constant relation. Therefore, if the target output voltage value Voxstg starts to be limited to the upper limit target output voltage value Voxstgmax in the process of performing the sub F/B compensation control in the first embodiment, the denominator becomes substantially constant. On the other hand, the numerator in the correction term is a fixed value.

Therefore, the sub F/B gain Grich on the rich air-fuel ratio side continuously increases to a particular maximum value according to the extent of the decrease in sensitivity of the O$_2$ sensor detected in the process of learning the maximum output voltage value Voxsmax.

As described above, according to the sub F/B compensation control in the second embodiment, even if there is the decrease in sensitivity due to the change with time in the O$_2$ sensor 217, the atmosphere in the three way catalyst 215 can be maintained at the slightly rich air-fuel ratio by correcting the sub F/B gain associated with the sub F/B control. In particular, according to the aforementioned control, it is possible to eliminate an influence of the decrease in sensitivity with time of the O$_2$ sensor 217 which occurs remarkably on the rich air-fuel ratio side which is richer than the theoretical air-fuel ratio, by correcting the sub F/B gain. Therefore, it is possible to prevent that a convergence value of the air-fuel ratio A/F by the sub F/B control inclines toward the rich side with respect to a genuine convergence value due to the decrease in sensitivity on the rich air-fuel ratio side which is greater than that on the lean air-fuel ratio side.

Incidentally, a gain correction aspect shown in the above equations (8) and (9) is merely one example. For example, various changes may be made to each of the equations, and a new correction equation may be also set.

Third Embodiment

Figure 8:
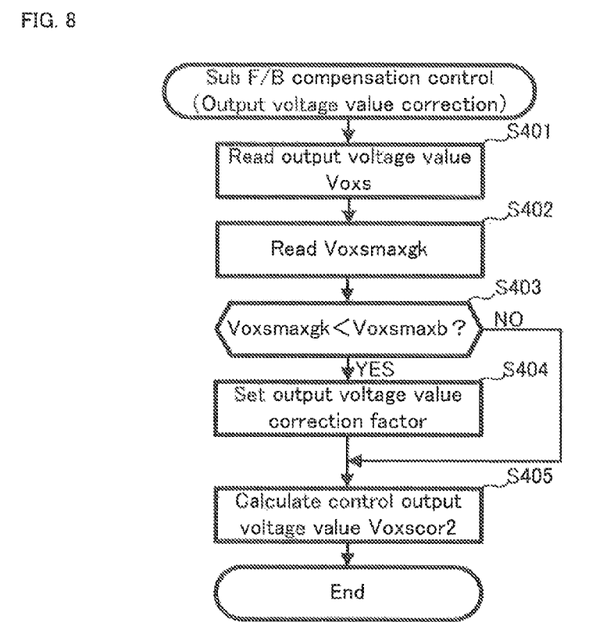
FIG. 8 is a flowchart illustrating sub F/B compensation control in a third embodiment of the present invention.

The method of correcting the influence of the decrease in sensitivity in the O$_2$ sensor 217 is not limited to the method in the second embodiment. Now, a third embodiment of the present invention based on such a purpose will be explained with reference to FIG. 8. FIG. 8 is a flowchart illustrating sub F/B compensation control in the third embodiment.

The sub F/B compensation control in the third embodiment is configured to compensate the accuracy of the sub F/B control by correcting the output voltage value Voxs of the O$_2$ sensor 217 if there is the change in sensitivity in the O$_2$ sensor 217 due to the change with time. In other words, in the embodiment, the ECU 100 functions as one example of the "output value correcting device" of the present invention.

In FIG. 8, the ECU 100 reads the output voltage value Voxs of the O$_2$ sensor 217 (step S401). The ECU 100 then reads the maximum output voltage learning value Voxsmaxgk (step S402).

After reading those values, the ECU 100 determines whether or not the maximum output voltage learning value Voxsmaxgk is less than the reference maximum output voltage value Voxsmaxb described in the second embodiment (step S403). The step S403 is a process of determining whether or not there is the change with time in the O$_2$ sensor 217.

If the maximum output voltage learning value Voxsmaxgk is less than the reference maximum output voltage value Voxsmaxb (the step S403: YES), the ECU 100 sets an output voltage correction factor C (step S404) and moves the process to a step S405. If the maximum output voltage learning value Voxsmaxgk is greater than or equal to the reference maximum output voltage value Voxsmaxb (the step S403: NO), the ECU 100 skips the step S404 and moves the process to the step S405.

Here, in the step S404, the ECU 100 sets the output voltage correction factor C according to the following equation (10).

$$C = Voxsmaxb / Voxsmaxgk \quad (10)$$

In the step S405, a control output voltage value Voxscor2 is calculated according to the determination result in the step S403 (step S405). The control output voltage value Voxscor2 is a virtual output voltage value of the O$_2$ sensor 217 obtained by correcting the decrease in sensitivity in the O$_2$ sensor 217.

If the maximum output voltage learning value Voxsmaxgk is greater than or equal to the reference maximum output voltage value Voxsmaxb in the step 403, the ECU 100 does not correct the output voltage value Voxs in the step S405. In other words, the control output voltage value Voxscor2 matches the output voltage value Voxs.

On the other hand, if the maximum output voltage learning value Voxsmaxgk is less than the reference maximum output voltage value Voxsmaxb in the step S403, the ECU 100 corrects the output voltage value Voxs according to the following equation (11) in the step S405.

$$Voxscor2 = C * Voxs \quad (11)$$

In other words, if there is the decrease in sensitivity in the O$_2$ sensor 217, the output voltage value Voxs is corrected to increase. Qualitatively, the output voltage value Voxs is corrected to a value which would be outputted before there is the decrease in sensitivity in the sensor.

As described above, according to the embodiment, the decrease in sensitivity of the O$_2$ sensor 217 is comprehended in the process of learning the maximum output voltage value Voxsmax, and the output voltage value Voxs is corrected to increase according to the extent of the decrease in sensitivity. It is thus possible to mitigate the influence of the change with time in the O$_2$ sensor 217 on the accuracy of the sub F/B control.

The present invention is not limited to the aforementioned embodiments, but various changes may be made, if desired, without departing from the essence or spirit of the invention which can be read from the claims and the entire specification. A control apparatus for an internal combustion engine, which involves such changes, is also intended to be within the technical scope of the present invention.

INDUSTRIAL APPLICABILITY

The present invention can be applied to the control of an internal combustion engine which is provided with an air-fuel ratio sensor on an upstream side of a three way catalyst and an oxygen concentration sensor on a downstream side and in which a fuel injection amount is controlled by first F/B control based an air-fuel ratio detected by the air-fuel ratio sensor and second F/B control based on an oxygen concentration detected by the oxygen concentration sensor.

DESCRIPTION OF REFERENCE CODES

10 engine system
100 ECU 200 engine
202A cylinder block
202B cylinder
211 intake port injector
214 exhaust tube
215 three way catalyst
216 air-fuel ratio sensor
217 O$_2$ sensor

The invention claimed is:

1. A control apparatus for an internal combustion engine configured to control the internal combustion engine which comprises:
   a three way catalyst disposed in an exhaust passage;
   an air-fuel ratio sensor disposed on an upstream side of the three way catalyst: and
   an oxygen concentration sensor disposed on a downstream side of the three way catalyst,
   said control apparatus comprising:
   a controller which is configured to perform first feedback (F/B) control in which an air-fuel ratio of a gas flowing into the three way catalyst converges to a target air-fuel ratio, based on an output value of the air-fuel ratio sensor, perform second F/B control in which the target air-fuel ratio or the output value of the air-fuel ratio sensor is corrected such that an output voltage value of the oxygen concentration sensor matches a target output value, learn an output characteristic corresponding to an individual variation of a detection limit of an oxygen concentration of the oxygen concentration sensor, correct a learning value of the output characteristic based on a terminal temperature of the oxygen concentration sensor when the output characteristic is learned, and set the target output value according to the learning value.

2. The control apparatus for the internal combustion engine according to claim 1, wherein
   said controller is further configured to set an upper limit of the target output value according to the learning value, and set the target output value in a range which is less than or equal to the set upper limit.

3. The control apparatus for the internal combustion engine according to claim 2, wherein the output characteristic includes at least one of a maximum output value and a minimum output value of the oxygen concentration sensor.

4. The control apparatus for the internal combustion engine according to claim 1, wherein the output characteristic includes at least one of a maximum output value and a minimum output value of the oxygen concentration sensor.

5. The control apparatus for the internal combustion engine according to claim 1, wherein
   said controller is further configured to correct a F/B gain associated with the second F/B control according to the learning value.

6. The control apparatus for the internal combustion engine according to claim 1, wherein
   said controller is further configured to correct the output value according to the learning value.

* * * * *